US012278369B2

(12) United States Patent
Subramanian et al.

(10) Patent No.: US 12,278,369 B2
(45) Date of Patent: Apr. 15, 2025

(54) LITHIUM ION BATTERY FOR POWER TOOLS

(71) Applicant: TECHTRONIC CORDLESS GP, Anderson, SC (US)

(72) Inventors: Aditya Subramanian, Hong Kong (CN); Denis Gaston Fauteux, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 545 days.

(21) Appl. No.: 17/633,236

(22) PCT Filed: May 27, 2020

(86) PCT No.: PCT/CN2020/092598
§ 371 (c)(1),
(2) Date: Feb. 7, 2022

(87) PCT Pub. No.: WO2021/031647
PCT Pub. Date: Feb. 25, 2021

(65) Prior Publication Data
US 2022/0376248 A1 Nov. 24, 2022

(30) Foreign Application Priority Data
Aug. 20, 2019 (HK) .................. 19128447.0

(51) Int. Cl.
*H01M 4/583* (2010.01)
*H01M 4/02* (2006.01)
(Continued)

(52) U.S. Cl.
CPC ........... *H01M 4/583* (2013.01); *H01M 4/386* (2013.01); *H01M 4/505* (2013.01); *H01M 4/525* (2013.01);
(Continued)

(58) Field of Classification Search
CPC ...... H01M 4/386; H01M 4/505; H01M 4/525; H01M 4/583; H01M 4/587; H01M 10/0568; H01M 10/0569
See application file for complete search history.

(56) References Cited

U.S. PATENT DOCUMENTS

2012/0141883 A1 6/2012 Smart et al.
2013/0266875 A1* 10/2013 Matsumoto ........... H01M 4/382
29/623.5
(Continued)

FOREIGN PATENT DOCUMENTS

CN 102881951 A 1/2013
CN 109687022 A 4/2019
(Continued)

OTHER PUBLICATIONS

European Patent Office, Communication, Extended European Search Report issued for European Patent Application No. 20854807.3, dated Dec. 6, 2023, 7 pages.
(Continued)

*Primary Examiner* — Brittany L Raymond
(74) *Attorney, Agent, or Firm* — Norton Rose Fulbright US LLP

(57) ABSTRACT

There is provided a lithium ion battery for use in a power tool. The lithium ion battery includes a carbon-based negative electrode containing a certain weight content of silicon-based material, a positive electrode including a lithium metal oxide containing nickel, and a non-flammable electrolyte placed between the negative electrode and the positive electrode. The weight content of silicon-based material in the negative electrode is no less than 5%. A composition of nickel of the lithium metal oxide is no less than the composition of other metals of the lithium metal oxide.

19 Claims, 3 Drawing Sheets

(51) Int. Cl.
  *H01M 4/38*      (2006.01)
  *H01M 4/505*     (2010.01)
  *H01M 4/525*     (2010.01)
  *H01M 10/0525*   (2010.01)

(52) U.S. Cl.
  CPC .. *H01M 10/0525* (2013.01); *H01M 2004/027* (2013.01); *H01M 2004/028* (2013.01); *H01M 2220/30* (2013.01)

(56) References Cited

U.S. PATENT DOCUMENTS

| | | | |
|---|---|---|---|
| 2018/0175387 A1 | 6/2018 | Kim et al. | |
| 2018/0175388 A1* | 6/2018 | Han | H01M 4/505 |
| 2019/0207209 A1* | 7/2019 | Venkatachalam | H01M 4/131 |

FOREIGN PATENT DOCUMENTS

| | | |
|---|---|---|
| CN | 109904447 A | 6/2019 |
| JP | 2018116840 A | 7/2018 |

OTHER PUBLICATIONS

PCT Application No. PCT/CN2020/092598, International Search Report and Written Opinion, Sep. 30, 2020, 7 pages.

* cited by examiner

LITHIUM ION BATTERY FOR POWER TOOLS

CROSS-REFERENCE TO RELATED APPLICATIONS

This application is a national phase application under 35 U.S.C. § 371 of International Application No. PCT/CN2020/092598 filed May 27, 2020, which claims priority to Hong Kong patent application Ser. No. 19/128,447.0 filed Aug. 20, 2019. The entire contents of each of the above-referenced disclosures are specifically incorporated by reference herein without disclaimer.

FIELD OF THE INVENTION

The present invention relates to a lithium ion battery. More particularly, the present invention relates to a lithium ion battery for use in a power tool, having higher energy and power density with improved thermal stability.

BACKGROUND OF THE INVENTION

The lithium ion battery industry has developed rapidly with proliferation in the use of portable electronic devices, medical devices, electric vehicles, etc. Current lithium ion batteries include a negative electrode and a positive electrode and an electrolyte between the negative electrode and the positive electrode to separate the negative electrode and the positive electrode but allow the movement of a Li-ion. A lot of research is actively ongoing to provide higher energy and power density and better performance for the next generation lithium ion battery.

Depending on various applications, some factors are considered more than other factors. For example, higher energy density is required for portable electronic devices, electric vehicle and energy storage systems, higher power density is required for portable power tools, lawn and garden tools and vacuum cleaners while improved safety is important for all applications. However, independent research on a lithium ion battery for use in a power tool has not been conducted as actively as that for other devices such as for electric vehicles.

SUMMARY OF THE INVENTION

The present invention provides a lithium ion battery for use in a power tool, including a carbon-based negative electrode containing a certain weight content of silicon-based material, a positive electrode including a lithium metal oxide containing nickel, and a non-flammable electrolyte placed between the negative electrode and the positive electrode. The weight content of silicon-based material in the negative electrode is no less than 5%. A composition of nickel of the lithium metal oxide is no less than the composition of other metals of the lithium metal oxide.

The negative electrode may include graphite and the silicon-based material. The silicon-based material may include silicon, silicon oxide ($SiO_x$), or a combination of silicon and silicon oxide ($SiO_x$). The silicon-based material can be coated by graphite, graphene or other carbon-based material. The weight content of silicon-based material may range from 5% to 40%. The weight content of silicon-based material may be 8%. The weight content of silicon-based material may range from 15% to 40%, preferably 15%.

The positive electrode may include $Li_aNi_xA_yB_zO_2$ where $a \geq 1$, $x \geq 0.5$, $y+z=1-x$. The ratio of x, y and z is selected from a group consisting of 6:2:2, 8:1:1 and 9:0.5:0.5.

The positive electrode may include a core shell gradient material. The core shell gradient material may include $LiNiMnCoO_2$, and content of Ni is increased from an outer shell of the battery to a core of the battery. The positive electrode may include doping or surface coating. The dopants or coated material may include carbon, zirconium, aluminum or germanium.

The electrolyte may include an ionic liquid (IL). The IL may be protic or aprotic. The IL comprises of cations and anions. The cations may include imidazolium, pyridinium, Pyrrolidinium or Piperidinium. The anions may include bromides, chlorides, iodides, phosphates, $BF_4^-$, $PF_6^-$, $TFSI^-$ or $FSI^-$.

The lithium ion battery may have no less than 4 Ah in capacity. The lithium ion battery can be a cylindrical type, a prismatic type or a pouch type lithium ion battery.

According to the present invention, there is provided a lithium ion battery for use in a power tool. The lithium ion battery has no less than 4 Ah in capacity and satisfies a predetermined safety requirement.

The predetermined safety requirement can be determined to be met when the lithium ion battery does not burn or flame in normal condition. The lithium ion battery may satisfy the predetermined safety requirement without any fuse element, redundancy circuit or firmware protection.

The lithium ion battery may comprise a carbon-based negative electrode containing a certain weight content of silicon-based material, a core shell gradient positive electrode including a lithium metal oxide containing nickel, and a non-flammable electrolyte placed between the negative electrode and the positive electrode.

The lithium metal oxide may comprise $LiNiMnCoO_2$, and content of Ni is increased from an outer shell of the battery to a core of the battery.

The silicon base material may comprise silicon, silicon oxide (SiOx), or a combination of silicon and silicon oxide, and the weight content of silicon base material in the negative electrode ranges from 5% to 40%.

According to the present invention, the battery cell can be provided to be particularly suitable for power tool battery packs which require a high power (voltage, such as 18V, 36V, 48V and 54V) and which at the same time require a large capacity.

Other features and aspects of the invention will become apparent by consideration of the following detailed description and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter as well as additional items. Use of "consisting of" and variations thereof as used herein is meant to encompass only the items listed thereafter and equivalents thereof.

BRIEF DESCRIPTION OF THE DRAWINGS

These and other features of the invention will become more apparent from the following description, by way of example only, with reference to the accompanying drawings.

FIG. 1(a) shows an example cylindrical type lithium ion battery, FIG. 1(b) shows an example prismatic type lithium ion battery, and FIG. 1(c) shows an example pouch type lithium ion battery.

Figure 1:
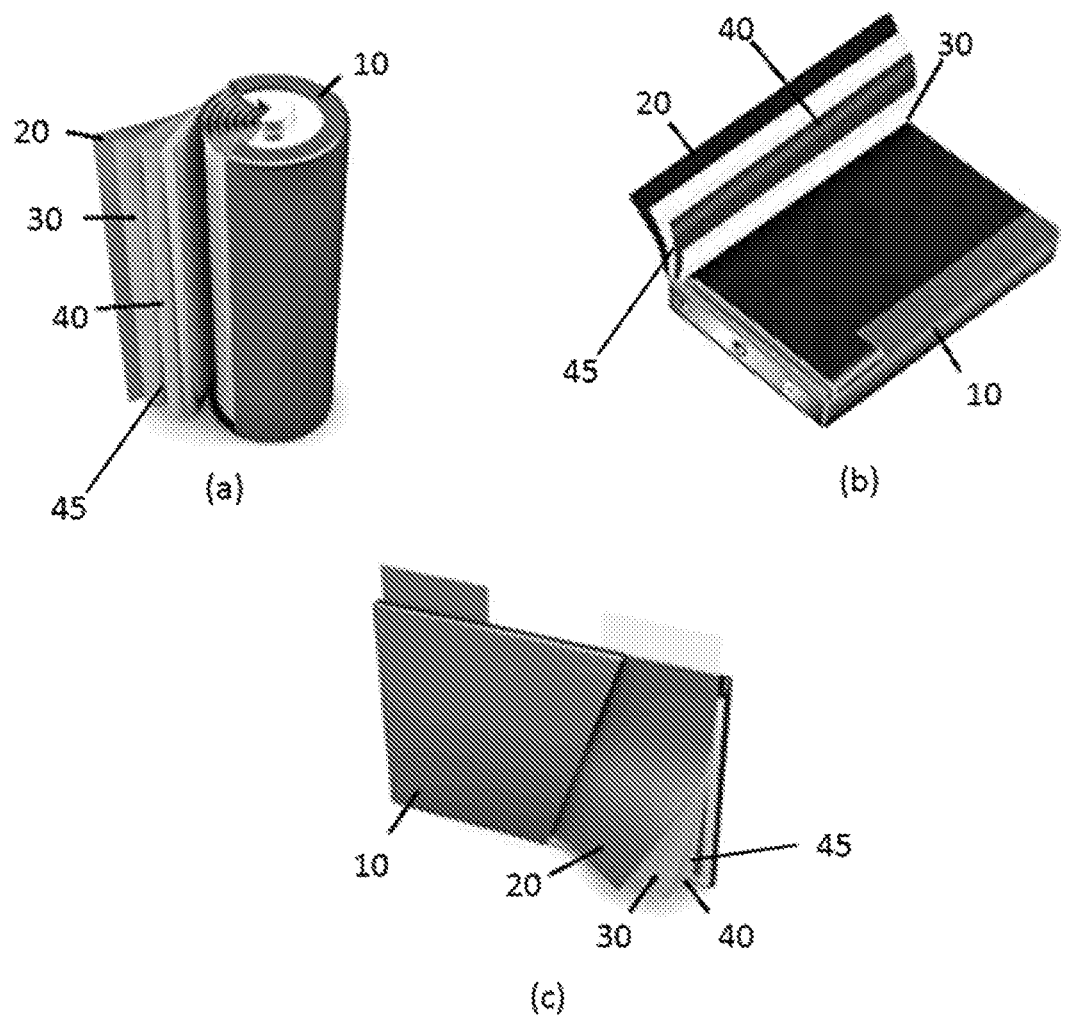
FIG. 1 shows a perspective view of a lithium ion battery according to one embodiment of the present invention.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

A lithium ion battery described herein includes a positive electrode and a negative electrode and an electrolyte placed between the positive and negative electrodes. Lithium ions are released from the negative electrode during discharge with the generation of electrons from the oxidation of lithium upon its release from the electrode. Lithium ions move toward the positive electrode through the electrolyte and are neutralized with the consumption of electrons. For charging of the lithium ion battery, the flow of lithium ions is reversed through a cell.

A lithium ion battery described herein is preferably used for power tools among other various applications including portable electronic devices, medical devices, storage devices, electric cars, etc.

A lithium ion battery described herein can be provided in various types such as a cylindrical cell, a prismatic cell or a pouch cell depending on applications of different kinds of power tools. For example, it is preferred to use a cylindrical cell of 18 mm diameter and 65 mm in length (18650) with low ACIR (Alternating Current Internal Resistance), less than 20 mOhms, and low DCIR (Direct Current Internal Resistance), less than 30 mOhms, a cylindrical cell of 21 mm in diameter and 70 mm in length (21700) with low ACIR, less than 15 mOhms, and low DCIR, less than 25 mOhms, or a pouch cell of general dimension 90 mm in length and 65 mm in width and thickness not exceeding 5 mm having low ACIR of less than 5 mOhms and low DCIR of less than 10 mOhms and with external connecting electrical contact located in opposite ends of the cell.

In order to provide an improved performance of the lithium ion battery for power tools with consideration of higher energy density and higher power as well as relieved safety issues, material used for each elements of the lithium ion battery will be described hereinafter.

In one embodiment, the negative electrode includes primarily carbon-based material. The negative electrode includes primarily, but not limited to, graphite. The negative electrode further includes a certain weight content of silicon-based material. In one example, the silicon-based material includes silicon, silicon oxide ($SiO_x$), or a combination of silicon and silicon oxide ($SiO_x$). The silicon-based material can be coated by graphite, graphene or other carbon-based material.

In one example, the weight content of the silicon-based material is not less than 5%. In another example, the weight content of the silicon-based material ranges from 5% to 40%. In this case, weight content of the graphite ranges from 60 to 95% according to the weight content of the silicon-based material. In yet another example, the weight content of the silicon-based material is about 8%.

In yet another example, the weight content of the silicon-based material ranges from 15% to 40%. In this case, weight content of the graphite ranges from 60% to 85% according to the weight content of the silicon-based material. Preferably, the weight content of the silicon-based material is about 15%. Silicon has a theoretical specific capacity much higher than graphite, that is, more than ten times the capacity of the graphite. Therefore, introduction of silicon to the negative electrode results in increased capacity for the lithium ion battery. In consideration of large volume expansion of silicon, content of silicon can be adjusted based on applications of the lithium ion battery for different kinds of power tools.

According to one embodiment, the positive electrode includes a lithium metal oxide. The lithium metal oxide contains nickel. For example, the lithium metal oxide includes, but not limited to, $LiNiO_2$, $LiNiCoO_2$, $LiNiMnCoO_2$ $LiNiCoAlO_2$ or $LiNiMnCoAlO_2$. Preferably, the lithium metal oxide includes $Li_aNi_xA_yB_zO_2$ where $a \geq 1$, $x \geq 0.5$, $y+z=1-x$. Preferably, $Li_aNi_xA_yB_zO_2$ may include $LiNi_xMn_yCo_zO_2$ or $LiNi_xCo_yAl_zO_2$.

In one example, the lithium metal oxide is $LiNi_xMn_yCo_zO_2$, and composition of Ni, Mn and Co can be indicated as x, y and z, respectively, where $x \geq 0.5$, $y+z=1-x$. Here, x, the composition of Ni, is no less than other compositions, that is, y and z. For example, $LiNi_xMn_yCo_zO_2$ can be $LiNi_{0.6}Mn_{0.2}Co_{0.2}O_2$, $LiNi_{0.8}Mn_{0.1}Co_{0.1}O_2$ or $LiNi_{0.9}Mn_{0.05}Co_{0.05}O_2$. In this example, the ratio of Ni, Mn and Co compositions (x, y and z) is 6:2:2, 8:1:1 and 9:0.5:0.5, respectively.

In another embodiment, the positive electrode includes a core shell gradient (CSG) material. The core shell gradient material includes $LiNi_xA_yB_zO_2$ where $x+y+z=1$. $LiNi_xA_yB_zO_2$ can include $LiNi_xMn_yCo_zO_2$ or $LiNi_xCo_yAl_zO_2$. The ratio of x, y and z can gradually vary from a core of the battery to an outer shell of the battery. For example, x, the composition of Ni can be increased from the outer shell of the battery to the core of the battery. That is, the composition of Ni can be the largest at the core and can be the smallest at the outer shell. On the other hand, the compositions of A and B, i.e., y and z can be increased from the core to the outer shell. For example, $LiNi_xA_yB_zO_2$ can be $LiNi_{0.8}A_{0.1}B_{0.1}O_2$ at the core and $LiNi_xA_yB_zO_2$ can be $LiNi_{1/3}A_{1/3}B_{1/3}O_2$ at the outer shell. Between the core and the outer shell, $LiNi_xA_yB_zO_2$ can have composition of x being gradually decreased from 0.8 to ⅓ across from the core to the outer shell while the compositions of y and z being increased from 0.1 to ⅓ across from the core to the outer shell, where $x+y+z=1$. Here, y and z can have the same value or different values as long as they meet $x+y+z=1$.

For another example, the core shell gradient material includes two or more discrete layers of lithium metal oxide material. For example, the core shell gradient material includes three discrete layers of lithium metal oxide material. In this example, the lithium metal oxide material is $LiNi_xA_yB_zO_2$ (where x+y+z=1), and three layers of the lithium metal oxide material have different compositions of Ni, A and B. As described above, A and B can be Mn and Co, or Co and Al. Composition of Ni can be increased from an outer layer to a core layer. Here, an innermost layer (i.e., a core layer) includes highest Ni composition among the three layers and Ni composition is reduced in the next outer layer and is more reduced in the outermost layer. For example, innermost layer material is $LiNi_{0.8}A_{0.1}B_{0.1}O_2$, second layer to the innermost layer is $LiNi_{0.6}A_{0.2}B_{0.2}O_2$ and outermost layer is $LiNi_{1.3}A_{1/3}B_{1/3}O_2$. A person skilled in the art would understand the scope of the present invention is not be limited to these examples as long as the Ni composition is higher in an inner layer (i.e. a core) and lower in an outer layer (i.e., an outer shell) relatively. This structure can provide improved thermal safety for the battery as well as higher capacity.

In yet another embodiment, the positive electrode includes doping or surface coating. The dopants or coated material includes, but not limited to, carbon, zirconium, aluminum or germanium.

According to one embodiment, an electrolyte is provided between the negative electrode and the positive electrode. The electrolyte includes a non-flammable electrolyte. The non-flammable electrolyte includes an ionic liquid (IL). The IL may be protic or aprotic. The IL comprises of cations and anions. The cations include, but not limited to, imidazolium, pyridinium, pyrrolidinium, piperidinium, etc. The anions include, but not limited to, bromides, chlorides, iodides, phosphates, $BF_4^-$, $PF_6^-$, $TFSI^-$, $FSI^-$, etc. Chemical formula of some examples of cations and anions are provided as below.

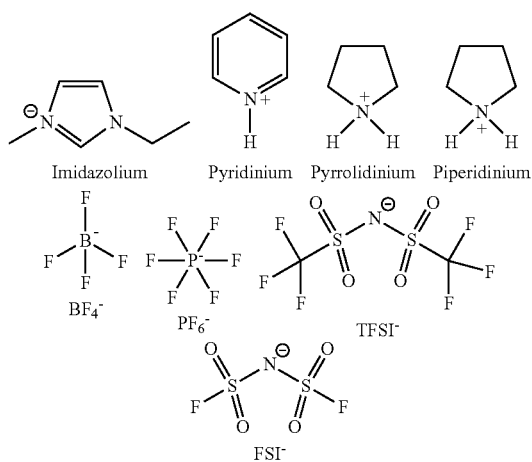

When a temperature increases, certain ionic compounds become liquids as a result of a thermal activation of the compounds. A salt in this state is generally denoted as "molten salt" some of which remain liquid at ambient temperature even at a very low temperature. Such molten salts are called as "ambient temperature ionic liquid" or "ionic liquid." By introducing ionic liquid for the electrolyte, the lithium ion battery can experience improved thermal stability with less safety issues such as short-circuit, overcharge or crush leading to fire or explosion.

According to one example, the lithium ion battery can be, but not limited to, a cylindrical type, a prismatic type or a pouch type as shown in FIG. 1. For example, FIG. 1(a) shows an example cylindrical type lithium ion battery comprising a case (10), a negative electrode (20), a separator (30), a positive electrode (40) and a non-flammable electrolyte (45). FIG. 1(b) shows an example prismatic type lithium ion battery comprising a case (10), a negative electrode (20), a separator (30), a positive electrode (40) and a non-flammable electrolyte (45). FIG. 1(c) shows an example pouch type lithium ion battery comprising a pouch (10), a negative electrode (20), a separator (30), a positive electrode (40) and a non-flammable electrolyte (45). The negative electrode (20) and the positive electrode (40) in each type of battery can include the materials and features as described herein for the negative electrode and the positive electrode, respectively. Each battery also includes the non-flammable electrolyte (45) placed between the negative electrode and the positive electrode. The non-flammable electrolyte (45) can be inserted between the different layers of positive electrode, negative electrode and the separators. The electrolyte (45) includes the ionic liquid (IL) as described herein.

Figure 2:
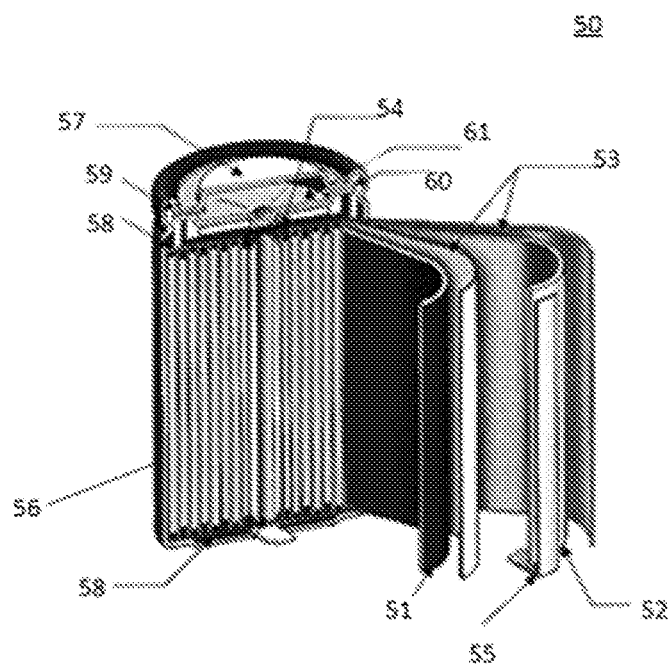
FIG. 2 shows a perspective view of a cylindrical type lithium ion battery according to another embodiment of the present invention.

FIG. 2 shows another example cylindrical type lithium ion battery (50). The lithium ion battery (50) includes layers of a cathode (i.e., positive electrode, 51), an anode (i.e., negative electrode, 52) and two separators (53) rolled up into a cylindrical can. The lithium ion battery (50) further includes a cathode lead (54) to connect the cathode with a positive terminal, an anode lead (55) to connect the anode with a negative terminal, an anode can (56), a top cover (57), insulators (58) to prevent short circuit between two conductors, a gasket (59) to fill a space between the can and the positive terminal, a positive temperature coefficient (PTC) element (60) to protect the batteries by limiting current at high temperatures, and a safety vent (61) to release excess gases.

Figure 3:
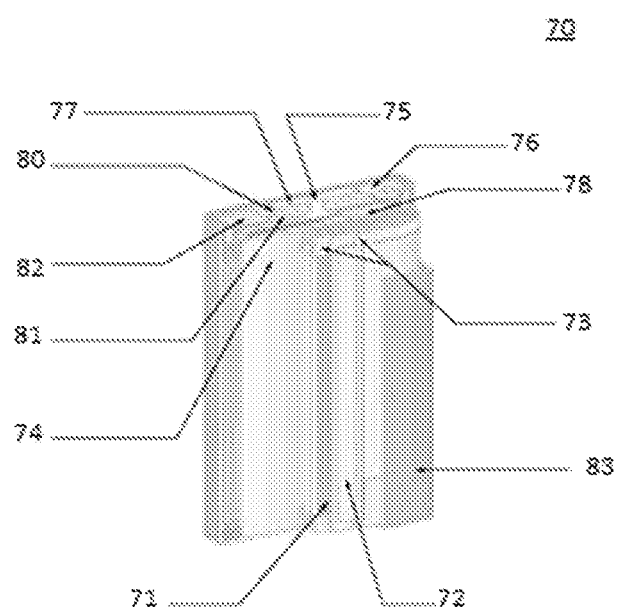
FIG. 3 shows a perspective view of a prismatic type lithium ion battery according to another embodiment of the present invention.

FIG. 3 shows another example prismatic type lithium ion battery (70). The lithium ion battery (70) includes layers of a cathode (71), an anode (72) and two separators (73) rolled and flattened to fit into a prismatic can. The lithium ion battery (70) further includes a cathode lead (74), a cathode pin (75), a cap plate (76), a terminal plate (77), an insulator case (78), an insulator (80), a gasket (81), a safety vent (82) and an anode can (83).

Figure 4:
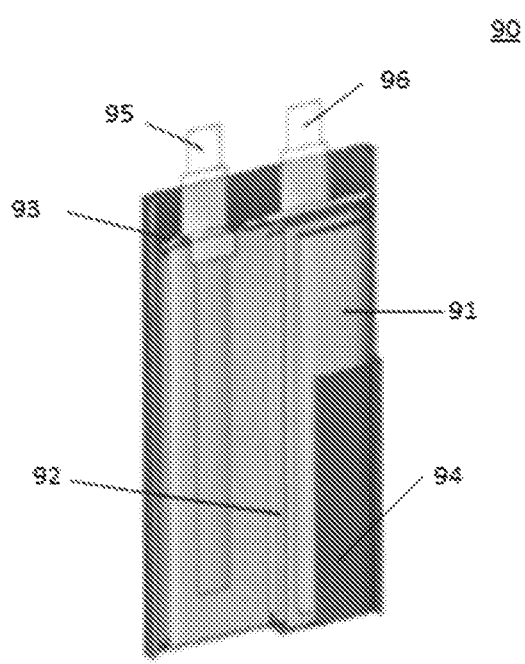
FIG. 4 shows a perspective view of a pouch type lithium ion battery according to another embodiment of the present invention.

FIG. 4 shows another example pouch type lithium ion battery (90). The lithium ion battery (90) includes a cathode (91), an anode (92), a top insulator (93), an aluminum laminate film (94), a cathode tab (95) and an anode tab (96).

According to one embodiment, the lithium ion battery is provided for use in a power tool, which has no less than 4Ah in capacity and satisfies a predetermined safety requirement. Here, the predetermined safety requirement is determined to be met when the lithium ion battery does not burn or flame in a normal condition. The normal condition is defined herein as the condition without any impact which would cause flame or burning. In particular, the lithium ion battery according to the present invention can be designed to satisfy the predetermined safety requirement without any fuse element, redundancy circuit or firmware protection. This can be achieved by a lithium ion battery including the materials or structure of the negative and positive electrodes and the electrolyte as described herein. Among other examples, the negative electrode can include graphite and a certain weight content of silicon-based material. The certain weight content of silicon-based material is no less than 5%, preferably, ranges from 5% to 40%. In one example, the weight content of the silicon-based material is about 8%. In another example, the weight content of the silicon-based material ranges from 15% to 40%, preferably, about 15%. The silicon-based material can include silicon, silicon oxide ($SiO_x$), or a combination of silicon and silicon oxide. The silicon-based material can be coated by graphite, graphene or other carbon- based material. The positive electrode may include a core shell gradient material of lithium metal oxide containing nickel. The lithium metal oxide can include $LiNi_xA_yB_zO_2$ where x+y+z=1. $LiNi_xA_yB_zO_2$ can include $LiNi_xMn_yCo_zO_2$ or $LiNi_xCo_yAl_zO_2$. The ratio of x, y and z can gradually or discretely vary from a core of the battery to an outer shell of the battery. For example, x, the composition of Ni can be increased from the outer shell to the core. The electrolyte is a non- flammable electrolyte and may include the ionic liquid as described herein.

According to the present invention, the lithium ion battery has no more than 10 mOhms in internal resistance. The lithium ion battery can fully be discharged at current up to 20 A without reaching a temperature greater than 75° C. at the end of discharge. The lithium ion battery can be charged in 1 hour or less. The lithium ion battery can be charged at temperature as low as 0° C.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable subcombination.

The invention claimed is:

1. A lithium ion battery for use in a power tool, comprising:
    a carbon-based negative electrode containing a weight content of silicon-based material;
    a positive electrode including one or more lithium metal oxides containing nickel to form a core shell gradient, the one or more lithium metal oxides comprising an $Li_aNi_xA_yB_zO_2$ formulation, and the core shell gradient including at least a first layer having a ratio of x, y and z being 0.8:0.1:0.1, a second layer having a ratio of x, y and z being 0.6:0.2:0.2 and a third layer having a ratio of x, y and z being ⅓: ⅓: ⅓, the first layer being an innermost layer and the third layer being an outermost layer; and
    an ionic liquid (IL) electrolyte placed between the negative electrode and the positive electrode,
        wherein the weight content of silicon-based material in the negative electrode is no less than 5%.
2. The lithium ion battery of claim 1, wherein the negative electrode comprises graphite and the silicon-based material.
3. The lithium ion battery of claim 2, wherein the silicon-based material comprises silicon, silicon oxide (SiOx), or a combination of silicon and silicon oxide.
4. The lithium ion battery of claim 3, wherein the silicon-based material is coated by graphite, graphene or other carbon-based material.
5. The lithium ion battery of claim 1, wherein the silicon-based material ranges from 5% to 40% of a weight of the negative electrode.

6. The lithium ion battery of claim 5, wherein the silicon-based material is between 7% and 9% of a weight of the negative electrode.
7. The lithium ion battery of claim 5, wherein the silicon-based material is between 14% and 16% of a weight of the negative electrode.
8. The lithium ion battery of claim 1, wherein the silicon-based material ranges from 15% to 40% of a weight of the negative electrode.
9. The lithium ion battery of claim 1, wherein the positive electrode comprises the $Li_aNi_xA_yB_zO_2$ where a≥1, x≥0.5, y+z=1−x.
10. The lithium ion battery of claim 1, wherein the core shell gradient comprises $LiNiMnCoO_2$, and content of Ni is increased from an outer shell of the lithium ion battery to a core of the lithium ion battery.
11. The lithium ion battery of claim 1, wherein the IL electrolyte comprises cations and anions, and wherein the cations comprise imidazolium, pyridinium, pyrrolidinium or piperidinium, and the anions comprise bromides, chlorides, iodides, phosphates, $BF_4^-$, $PF_6^-$, $TFSI^-$ or $FSI^-$.
12. The lithium ion battery of claim 1, wherein the lithium ion battery has no less than 4 Ah in capacity.
13. The lithium ion battery of claim 1, wherein the lithium ion battery is a cylindrical type, a prismatic type or a pouch type lithium ion battery.
14. A lithium ion battery for use in a power tool, comprising:
    a carbon-based negative electrode containing a weight content of silicon-based material;
    a positive electrode including one or more lithium metal oxides containing nickel to form a core shell gradient, the one or more lithium metal oxides comprising an $Li_aNi_xA_yB_zO_2$ formulation, and the core shell gradient including at least a first layer having a ratio of x, y and z being 0.9:0.05:0.05, a second layer having a ratio of x, y and z being 0.8:0.1:0.1 and a third layer having a ratio of x, y and z being 0.6:0.2:0.2, the first layer being an innermost layer and the third layer being an outermost layer; and
    an ionic liquid (IL) electrolyte placed between the negative electrode and the positive electrode,
    wherein:
        the weight content of silicon-based material in the negative electrode is no less than 5%,
        a first composition of nickel of the one or more lithium metal oxides is no less than a second composition of other non-lithium metals of the one or more lithium metal oxides,
        the lithium ion battery has no less than 4Ah in capacity, and
        the lithium ion battery satisfies a predetermined safety requirement.
15. The lithium ion battery of claim 14, wherein the predetermined safety requirement is determined to be met when the lithium ion battery does not burn or flame in a normal condition.
16. The lithium ion battery of claim 15, wherein the lithium ion battery satisfies the predetermined safety requirement without any fuse element, redundancy circuit or firmware protection.
17. The lithium ion battery of claim 14, wherein the lithium ion battery comprises a core shell gradient positive electrode including the one or more lithium metal oxides containing nickel, and the IL electrolyte is placed between the negative electrode and the positive electrode.

18. The lithium ion battery of claim 17, wherein the one or more lithium metal oxides comprises $LiNiMnCoO_2$, and content of Ni is increased from an outer shell of the lithium ion battery to a core of the lithium ion battery.

19. The lithium ion battery of claim 17, wherein the silicon-based material comprises silicon, silicon oxide (SiOx), or a combination of silicon and silicon oxide, and the weight content of silicon-based material in the negative electrode ranges from 5% to 40%.

* * * * *

UNITED STATES PATENT AND TRADEMARK OFFICE
CERTIFICATE OF CORRECTION

PATENT NO. : 12,278,369 B2
APPLICATION NO. : 17/633236
DATED : April 15, 2025
INVENTOR(S) : Aditya Subramanian et al.

Page 1 of 1

It is certified that error appears in the above-identified patent and that said Letters Patent is hereby corrected as shown below:

In the Specification

Column 1, Line 10, delete "Hong Kong patent application Ser. No. 19/128,447.0" and replace with --Hong Kong patent application No. 19128447.0--.

In the Claims

Column 8, Claim 9, Line 11, delete "the $Li_aNi_xA_yB_zO_2$ where" and replace with --the $Li_aNi_xA_yB_zO_2$ formulation where--.

Signed and Sealed this
Twentieth Day of May, 2025

Coke Morgan Stewart
*Acting Director of the United States Patent and Trademark Office*